United States Patent [19]
Palmer

[11] 3,826,512
[45] July 30, 1974

[54] CART
[75] Inventor: Wesley G. Palmer, Corpus Christi, Tex.
[73] Assignee: Clayton Specialties, Inc., Corpus Christi, Tex.
[22] Filed: Feb. 16, 1973
[21] Appl. No.: 333,310

[52] U.S. Cl. ............................. 280/43.12, 280/46
[51] Int. Cl. ............................................ B62d 33/08
[58] Field of Search ............ 280/46, 43.12; 214/506

[56] References Cited
UNITED STATES PATENTS
2,342,430   2/1944   Shackleton ..................... 214/506 X
2,696,928   12/1954   Faircloth............................ 214/506

Primary Examiner—David Schonberg
Assistant Examiner—Michael J. Forman
Attorney, Agent, or Firm—Stewart N. Rice

[57] ABSTRACT

A cart for picking up and transporting articles, particularly trays, from a surface, which cart has a wheel-supported platform carrying surface hingedly connected to a rear structural member having a handle and a centered swiveling rear wheel. Pulling the handle rearwardly and downwardly causes the front edge of the platform to drop to the floor level where it may be easily inserted under articles to be picked up.

8 Claims, 8 Drawing Figures

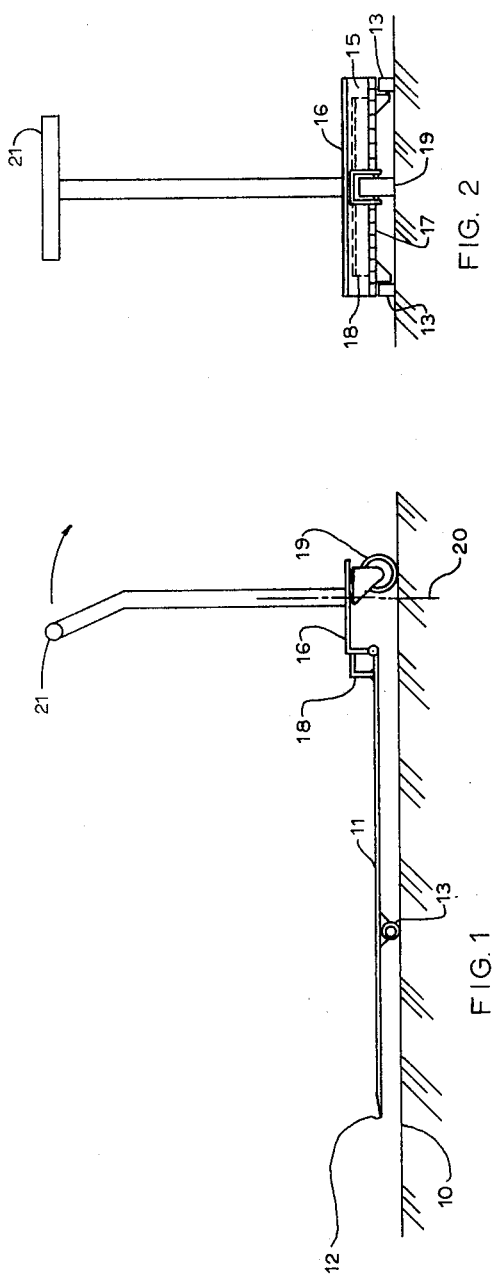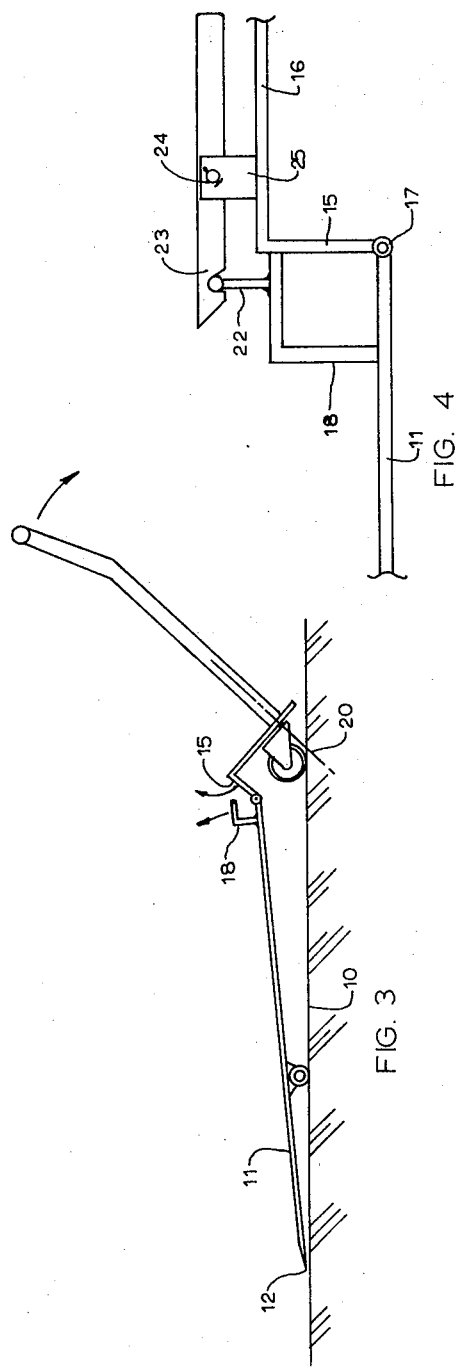

CART

BACKGROUND OF THE INVENTION

The present invention relates to a cart or dolly for picking up from a flat surface articles such as trays, boxes, or the like and then transporting such articles.

In various industries there is a frequent need for transporting from one location to another various articles such as trays or boxes by means of a hand cart or dolly. Many types of carts have been devised for such use, however none heretofore designed have adequately solved the problem of getting the articles onto the cart itself. With many types of carts it is necessary to place the articles onto a pallet in order that the carrying surface of the cart may be inserted under the articles. Other types of carts, such as the familiar two-wheeled hand cart, have a flat platform for inserting under articles and the lifting is accomplished by tilting the hand cart backwards. However, because of the manner of construction of the usual two-wheeled cart, it is sometimes difficult to slide the carrying platform under the articles as they rest on a floor without first tilting the articles themselves slightly, such being undesirable because of the time lost in the tilting operation. Further, after articles are picked up by a two-wheeled hand cart by tilting backward on a handle, the operator must maintain a precision angle of tilt while transporting the articles which is frequently difficult to accomplish when the articles are heavy. The operator of the cart is thus required to expend energy not only in causing the horizontal movement of the cart across the floor but also to expend energy in holding the cart at the correct angle of tilt while pushing or pulling the cart.

It is thus an object of the present invention to provide a hand cart which will easily accomplish the task of picking up articles resting on a floor without the benefit of a pallet and upon which hand cart such articles may be subsequently transported while in a level posture requiring only the power to push the loaded cart across the floor. It is a particular object of the present invention to provide such a cart for transporting stacks of trays such as trays for bakery products.

SUMMARY

These and other objects are accomplished by the present invention which in one of its aspects is a cart for picking up articles from a surface and transporting such articles, such cart in its normal transporting position comprising in combination the following elements: (a) a substantially flat, horizontally disposed platform which provides a carrying surface upon which the articles to be transported may rest, said platform having a thin forward edge adapted to be inserted under said articles as they rest on a surface, said platform having a rearward edge being connected by a hinge means to the hereafter defined rear structural member; (b) at least two fixed position forward wheels supporting said platform, said wheels having a horizontal common axis which is located a substantial distance rearwardly of said forward edge of said platform, said forward wheels being separated from each other along their common axis by a substantial distance; (c) a rear structural member having a substantially vertically disposed section fixedly and non-rotatably connected at the upper end thereof to a horizontally disposed section extending rearwardly from its connection with said vertically disposed section, said horizontally disposed section being at an elevation above that of said platform, the lower end of said vertically disposed section being attached by a hinge means to the said rearward edge of said platform, the axis of said hinge means about which rotation may take place being parallel to the said common axis of said forward wheels, said hinge means being such as to allow said platform to move with respect to said vertically disposed section such that the angle between them may increase from an angle of substantially 90° to an angle greater than 90°; (d) means to prevent said platform and said vertically disposed section of said rear structural member from moving with respect to each other at their hinged connection such that the angle between them becomes substantially less than 90°; (e) a single swiveling rear wheel supporting and attached to the underside of said horizontally disposed section of said rear structural member, which swiveling rear wheel swivels about an axis of swivel which is perpendicular to said horizontally disposed section and which axis of swivel lies in a vertical plane bisecting the distance between said forward wheels and to which vertical plane the said common axis of said forward wheels is perpendicular; and (f) a rigid handle which is fixedly attached to and extends upwardly from the upper surface of said horizontally disposed section of said rear structural member; wherein in said cart the sizes and locations of the foregoing elements relative to each other are such that said forward edge of said platform will selectively drop to the level of said surface upon pulling downwardly and backwardly on said handle by reason that such pulling causes the rotation about said hinge means of said vertically disposed section that the angle between said vertically disposed section and said platform increases and causes an increase in elevation of said hinge means and the said rearward edge of said platform.

DESCRIPTION OF THE FIGURES

FIG. 1 is a side view of a cart constructed in accordance with the present invention while in a transporting position.

FIG. 2 is a rear view of the cart of FIG. 1.

FIG. 3 is a side view of the cart of FIG. 1 broken down in pick-up position so that it may be inserted under an article to be picked up and transported.

FIG. 4 is a side view of a latching mechanism as may be mounted on a cart.

DETAILED DESCRIPTION OF THE INVENTION

Figure 5:
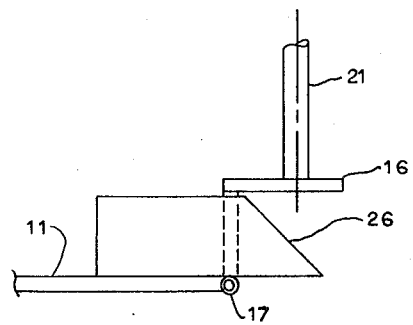
FIG. 5 is a side view of a stop means as may be mounted on a cart.

Referring to FIGS. 1 and 2, there is illustrated a cart or dolly useful in picking up articles resting on a flat surface 10 and transporting such articles, the cart being illustrated in its normal transporting position in such FIGS. 1 and 2. The cart is comprised of a platform 11 which provides a flat horizontal carrying surface on which the articles may rest, the forward edge 12 of such platform being thin so as to allow its easy insertion under the articles to be picked up and transported. As illustrated in the drawing the forward edge 12 is thinner than the remainder of platform 11, however where the platform itself is constructed of relatively thin material then the forward edge (while it does have to be thin) does not have to be thinner than the platform itself. The shape of the platform will of course vary according to the articles to be transported with the most versatile shape being generally rectangular. When using a platform of a generally rectangular shape it may be desirable to round the corners on the forward edge so as to avoid damage to objects which the cart may inadvertently collide with.

Supporting platform 11 at some distance from the forward edge are two fixed position forward wheels 13 which have a horizontal common axis about which wheels 13 rotate. As may be seen in FIG. 2, each of wheels 13 is located on opposite sides of platform 11 from the other. The main requirement is that the forward wheels be separated from each other for ease in steering the cart and for stability although such do not have to be precisely at the side edges of platform 11. Further it is not necessary that the height of platform 11 be above that of wheels 13; for example, the wheels could be located outwardly of platform 11 with their common axis coinciding with the platform height. In this latter case the height of the wheels would extend above the platform by a distance equal to the radius thereof. In practice it has been found preferable to locate forward wheels 13 both inwardly of the side edges of platform 11 as well as to not extend above the upper surface of platform 11. The advantage of such a wheel placement is to avoid contact of the wheels with the articles to be transported (such as where the article is wider than the platform) and also to allow the overall cart width to be as small as possible for ease in moving the cart through narrow passageways. The wheels themselves can be constructed of any suitable material such as hard rubber, plastic or steel depending on the surface to which they are to be put.

Hingedly connected by means of hinge 17 to the rear edge of platform 11 is a rear structural member having a substantially vertically disposed section 15 and a substantially horizontally disposed section 16. The lower end of vertically disposed section 15 is connected by hinge 17 to the rear edge of platform 11 and the upper end of vertically disposed section 15 joins and is connected to the forward edge of horizontally disposed section 16 which extends rearwardly from such connection. The rear structural member could for example be constructed of two rectangular metal plates welded together at their edges at right angles to each other. Hinge 17 allows the rear structural member to rotate with respect to platform 11, and, to function properly the axis of hinge 17 about which rotation may take place must be parallel to the common axis of the forward wheels 13. As illustrated in FIG. 2, hinge 17 extends across the entire width of the cart, which is preferable for strength reasons although not absolutely necessary. For example platform 11 could be connected to vertically disposed section 15 merely by a couple of small co-axial hinges located at either edge of the cart although not much strength would result from such an arrangement. In manufacturing the cart it has been preferable to form hinge 17 by providing spaced apart loops in the rear edge of platform 11 which mesh with spaced apart loops in vertically disposed section 15, and through which intermeshed loops a pin is inserted.

As will be seen from the hereafter set forth explanation of the manner of using the cart, hinge 17 is provided such that the angle between vertically disposed section 15 and platform 11 may become greater than 90°; however means must be provided to prevent such angle from becoming less than 90°. Some means may be provided in the hinge itself to prevent such or some means exterior of hinge 17 may be provided. The preferred means for preventing such is illustrated in FIG. 1 where a rigid brace 18 is shown. Brace 18 is formed by a length of angle iron which is slightly shorter than the width of platform 11, and one edge of which angle iron is welded to the upper surface of platform 11 such that the angle iron extends upwardly and thence rearwardly into contact with the forward surface of vertically disposed section 15. Since brace 18 is not fixedly connected to vertically disposed section 15, hinge 17 will allow vertically disposed section 15, to rotate with respect to platform 11 such that the angle between them is greater than 90° will prevent such angle from becoming less than 90°. Actually brace 18 does not have to be constructed from angle iron and can merely be a straight rod welded at one end to the upper surface of platform 11 and angling upward therefrom at for example a 45° angle into firm contact with the forward face of vertically disposed section 15. Or such an iron rod could be fixedly attached at one end to the forward surface of the vertically disposed section 15 and angled downwardly into contact with the upper surface of platform 11. Many ways will be obvious to those skilled in the art to prevent such angle from becoming less than 90° but allowing such to become greater than 90°. The preferable method is that illustrated by use of brace 18 having a flat, vertical, rectangular section which is fixedly connected to the upper surface of platform 11 so as to be perpendicular thereto, and which extends therefrom upwardly to a height no greater than that of the upper surface of horizontal disposed section 16. A horizontal section of brace 18 (which is preferably a flat, rectangular section) then extends in a rearward direction perpendicularly from the upper end of such vertical rectangular section into firm contact with the forward surface of vertically disposed section 15 of the rear structural member of the cart. By use of a brace 18 which has a flat, vertical section which is perpendicular to platform 11, a backstop is provided for articles being picked up by the cart.

A single swiveling rear wheel 19 is firmly attached to the underside of horizontally disposed section 16 and supports such section. The rear wheel swivels about an axis of swivel 20 which is perpendicular to horizontally disposed section 16 and which axis of swivel 20 lies in a vertical plane bisecting and perpendicular to the axis of forward wheels 13. In other words the rear wheel is located midway between the sides of the cart. For ease in pushing and pulling the cart as well as ease in breaking down the cart so that it may slide under articles to be picked up and transported, rear wheel 19 is preferably of the off-set type shown where axis of swivel 20 about which the swiveling motion takes place does not pass through the horizontal axis about which rear wheel 19 rotates.

There is firmly affixed to the upper surface of horizontally disposed section 16 a rigid handle 21 which will be used to push and pull the cart. Although a T-bar type of handle is illustrated, practically any type of handle can be used such as a single straight bar or a double handle type as commonly used on two-wheeled hand carts. In the cart illustrated the axis of the lower end of handle 21 is the same as axis of swivel 20 and this has been found preferable but not absolutely necessary. Improved operation and breakdown of the cart is however obtained when the point or points of connection of the handle are located at least as far rearwardly as is the axis of swivel 20.

In order to illustrate the operation and use of the cart to pick up articles from a surface 10 and then transport them, reference is made to FIG. 3. When it is desired to pick up an article from surface 10, the cart is rolled (in the transporting position of FIG. 1) so as to place the forward edge 12 adjacent to or near the article. Handle 21 is then pulled rearwardly and downwardly which, because of hinge 17 and the relative sizes of the elements of the cart, causes hinge 17 to be elevated while simultaneously vertically disposed section 15 and brace 18 rotate with respect to each other about hinge 17 such that their upper ends move away from each other (as shown by the arrows). As may be seen the angle between brace 18 and vertically disposed section 15 becomes greater than 90°. As hinge 17 and thus the rear edge of platform 11 is elevated, front wheels 13 act as fulcrum causing forward edge 12 to be lowered to surface 10. By pushing the cart forward while it is in a broken down position, forward edge 12 can be inserted under the articles such that the articles move onto platform 11. In order to lift the articles entirely off the floor and transport them, handle 21 is then raised and pushed forward causing the cart to assume the transporting position as shown in FIG. 1. To unload the cart handle 21 would be pulled backwardly and downwardly so as to drop forward edge 12 to floor level, and then pulling the cart rearwardly out from under the articles resting thereon. If the cart is initially pushed to the area of the articles to be picked up, swiveling rear wheel 19 will be in the position shown in FIG. 1 where the horizontal axis about which rear wheel 19 rotates is rearwardly of axis of swivel 20. When handle 21 is pulled down and back in order to break down the cart to the pick up position, a swiveling motion takes place wherein rear wheel 19 swivels to a position forward of axis of swivel 20 as illustrated in FIG. 3. Such swiveling action during breakdown allows handle 21 to be dropped to a lower position than would be possible where a swiveling rear wheel which was not off-set were used. The lower position of handle 21 is desirable since the axis of the handle will be more nearly corresponding to the line of thrust when forcing platform 11 under the articles.

Because of the nature of the breakdown of the cart from a transporting position to a pick up position, it can be seen that the size and location of the various elements relative to each other is important. Thus the axis of forward wheels 13 must be located a distance rearwardly of forward edge 12 such that upon moving handle 21 downwardly and rearwardly to break down the cart, forward edge 12 will drop to the level of surface 10. In order to accomplish this desired drop of forward edge 12, rear wheel 19 must be located the proper distance rearwardly of hinge 17 such that hinge 17 (and thus the rear end of platform 11) will be elevated a distance sufficient to cause forward edge 12 to drop to surface level, which in turn will depend somewhat on the size of the rear wheel 19. As pointed out above, the points of attachment of handle 21 to horizontally disposed section 16 should be at least as far rearward as axis of swivel 20 such that pulling downwardly and rearwardly on handle 21 will cause the desired elevating of hinge 17.

Illustrated in FIG. 4 is a desirable feature of a cart constructed in accordance with the present invention. Shown in FIG. 4 is a selectively disengageable latching device which serves to lock the position of platform 11 with respect to vertically disposed section 15 and thus serves to maintain the angle between such at 90°. The reason for the provision of a selectively disengageable locking device is to prevent accidental breakdown of the cart to the pick up position during a transporting operation. For example in maneuvering a loaded cart, it may be necessary to pull the cart backward as well as to push it forward. If a locking mechanism is not on the cart an attempt to move the cart backwards by pulling rearwardly on handle 21 might also result in he handle's moving both rearwardly and downwardly which of course would result in the undesirable lowering of forward edge 12. In FIG. 4 the latching mechanism is shown as it would be mounted on a cart such as that of FIGS. 1, 2 and 3, with the portion of the cart not pertinent to the latching mechanism being deleted. The latching mechanism comprises a catch 22 firmly attached to the top of the brace 18 (as by welding), which catch is positioned so that the lip thereon will engage a corresponding groove on lock bar 23. Lock bar 23 itself pivots on a rod 24 which is suspended in bracket 25 mounted on the upper surface of horizontally disposed section 16. Although not illustrated in the drawing it is also desirable to have a spring means of some type which will tend to force the forward edge of lock bar 23 downwardly such that the groove is in engagement with catch 22. It may be seen that when lock bar 23 is engaged with catch 22, a breakdown of the cart is impossible. When it is desired to break down the cart to the pick up position, the rear end of lock bar 23 can be depressed (as with the operator's foot) in the direction of the arrow, and, with rod 24 acting as a fulcrum the forward end of lock bar 23 is elevated so as to disengage from catch 22. The cart may be then broken down so as to drop the forward edge 12 by pulling rearwardly and downwardly on handle 21. The type of latching mechanism shown in FIG. 4 is merely illustrative and is not to be taken as limiting the many types of selectively engageable and disengageable latching mechanisms which could be used to lock the cart in its transporting position.

Figure 6:
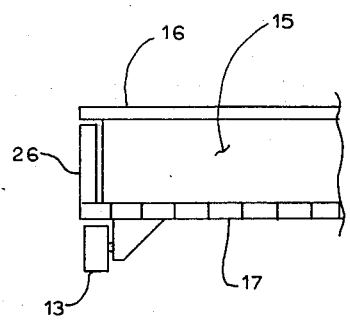
FIG. 6 is a rear view of FIG. 5.
Figure 7:
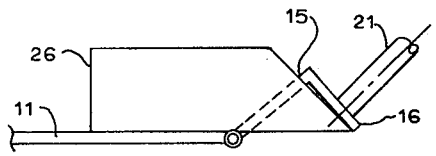
FIG. 7 is a side view of the stop means and cart of FIG. 5 broken down in pick-up position.

It is also advantageous to provide the cart with a stop means which will stop or prevent the handle from being lowered during breakdown more than is necessary to drop the forward edge of the cart to floor level. Such will prevent the handle from dropping to the floor in the event it becomes necessary for the operator to release his grip on the handle while the cart is in the pick up position, or in the event the operator should accidentally drop the handle while pulling it downwardly and rearwardly during breakdown of the cart. Various types of stop means can be provided and a couple of types are shown in FIGS. 5–8, with the type shown in FIGS. 5–7 being preferred. Referring to FIGS. 5–8 there is illustrated a roughly trapezoidal side plate 26 which will stop the travel of the rear structural member at a predetermined point by engagement with horizontally disposed section 16. In FIGS. 5–7 for simplicity of illustration and understanding, rear wheel is not shown connected to horizontally disposed section 16 nor is there illustrated any means such as lock bar 23 and brace 18 of FIG. 4 which could be present. Side plate 26 is firmly attached to the upper surface of platform 11 at the rear edge thereof so as to be perpendicular to platform 11 and parallel to its side enge. Side plate 26 then extends rearwardly underneath the side edge of horizontally disposed section 16, and to allow this vertically disposed section has been constructed so as to not extend to the side edge of platform 11 as may be seen in FIG. 6. The height of side plate 26 is such that its upper edge is only slightly below horizontally disposed section 16 when the cart is in the normal transporting position although it could actually be in sliding contact therewith. As may be seen in FIG. 7, when the handle of the cart is pulled rearwardly and downwardly such that horizontally disposed section 16 is tilted with respect to the horizontal, at some point during the breakdown the undersurface of horizontally disposed section 16 will engage the slanted edge portion of side plate 26 and prevent further downward movement. A side plate such as that illustrated could be placed at both rear edges of platform 11.

Figure 8:
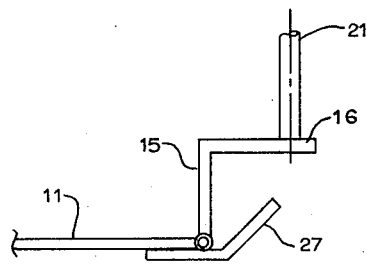
FIG. 8 is a side view of another stop means as may be mounted on a cart.

FIG. 8 shows another stop means as may be mounted on a cart such as that of FIG. 1 comprised merely of a stop bar 27 as would be constructed by bending a piece of bar stock at an obtuse angle. One section of the bar 27 would be firmly attached (as by welding) to the underside of platform 11 with the other end extending into the space underneath vertically disposed section 15 and horizontally disposed section 16. As may be seen the rear surface of horizontally disposed section 15 would engage bar 27 during some point of breakdown and prevent further lowering of handle 21. Bar 27 could be placed at any place across the width of the cart. In FIG. 8, for simplicity of illustration and understanding, the rear wheel is not illustrated nor is there illustrated any means such as lock bar 23 or brace 18 as in FIG. 4 which could be present if desired.

A specific embodiment of the present invention was constructed in the form of a cart as illustrated in FIGS. 1, 2 and 3. Platform 11, brace 18, vertically disposed section 15 and horizontally disposed section 16 were all constructed of ¼ inch thick steel plate. The wheels 13 were placed such that their common axis was 10½ inches from forward edge 12 and 20½ inches from hinge 17, such wheels being approximately 1½ inches in diameter. The upper surface of platform 11 was 1 13/16 inches above surface level 10 and the upper surface of horizontally disposed section 16 was 5¼ inches above surface level 10. The cart (and platform 11, horizontally disposed section 16 and vertically disposed section 15) were 14 inches wide and axis of swivel 20 was 4⅝ inches back of hinge 17. The distance from the forward surface of vertically disposed section 15 to the rear edge of horizontally disposed section 16 was 6 inches for an overall cart length of approximately 37 inches. Rear wheel 19 was approximately 3½ inches in diameter and handle 21 was constructed of 1½ inch pipe having a height of 45 inches above surface level 10.

I claim:

1. A cart for picking up articles from a surface and transporting said articles, such cart in its normal transporting position comprising in combination the following elements:

a. a substantially flat, horizontally disposed platform which provides a carrying surface upon which the articles to be transported may rest, said platform having a thin forward edge adapted to be inserted under said articles as they rest on a surface, said platform having a rearward edge being connected by a hinge means to a rear structural member;

b. at least two fixed position forward wheels supporting said platform, said wheels having a horizontal common axis which is located a substantial distance rearwardly of said forward edge of said platform, said forward wheels being separated from each other along their common axis by a substantial distance;

c. said rear structural member having a substantially vertically disposed section fixedly and non-rotatably connected at the upper end of said rear structural member to a horizontally disposed section extending rearwardly from its connection with said vertically disposed section, said horizontally disposed section being at an elevation above that of said platform, the lower end of said vertically disposed section being attached by a hinge means to the said rearward edge of said platform such that there is an angle between said platform and said vertically disposed section, said hinge means having an axis about which rotation may take place which is parallel to the said common axis of said forward wheels, said hinge means being such as to allow said platform to move with respect to said vertically disposed section such that the said angle between them may increase from an angle of substantially 90°;

d. means to prevent said platform and said vertically disposed section of said rear structural member from moving with respect to each other at their hinged connection such that the said angle between them becomes substantially less than 90°;

e. a single swiveling rear wheel supporting and attached to the underside of said horizontally disposed section of said rear structural member, which swiveling rear wheel swivels about an axis of swivel which is perpendicular to said horizontally disposed section and which axis of swivel lies in a vertical plane bisecting the distance between said forward wheels and to which vertical plane the said common axis of said forward wheels is perpendicular; and f. a rigid handle which is fixedly attached to and extends upwardly from the upper surface of said horizontally disposed section of said rear structural member;

wherein in said cart the sizes and locations of the foregoing elements relative to each other are such that said forward edge of said platform will selectively drop to the level of said surface upon pulling downwardly and backwardly on said handle by reason that such pulling causes the rotation about said hinge means of said vertically disposed section such that the angle between said vertically disposed section and said platform increases and causes an increase in elevation of said hinge means and the said rearward edge of said platform.

2. The cart of claim 1 wherein said swiveling rear wheel is of the off-set type such that the said axis of swivel does not pass through the horizontal axis about which said rear wheel rotates.

3. The cart of claim 2 wherein said platform is substantially a rectangle, one of the shorter sides of said rectangle being the forward edge of said platform, and wherein there are two of said fixed position forward wheels each of which is located substantially near or at the side edges of said platform.

4. The cart of claim 2 wherein said means to prevent said platform and said vertically disposed section from moving with respect to each other at their hinged connection such that the angle between them becomes substantially less than ninety degrees which comprises a brace which is fixedly attached to and extends vertically upward from the upper surface of said platform, thence horizontally in a rearwardly direction into contact with said vertically disposed section of said rear structural member.

5. The cart of claim 2 wherein said cart contains a selectively disengageable latching means to lock the position of said platform with respect to said vertically disposed section such that the angle between them may be selectively maintained at 90°.

6. The cart of claim 2 wherein said cart contains a stop means which during breakdown of the cart to the pickup position will prevent said rigid handle from being lowered rearwardly and downwardly more than is necessary to cause the said forward edge of said platform to be lowered to the level of said surface.

7. A cart for picking up articles from a surface and transporting said articles, such cart in its normal transporting position comprising in combination the following elements:
   a. a substantially flat, horizontally disposed platform which provides a carrying surface upon which the articles to be transported may rest, said platform having a shape substantially that of a rectangle wherein one of the shorter sides of said rectangle is the forward edge of said platform, said forward edge being thin so that it may be inserted under said articles as they rest on a surface, said platform having a rearward edge being connected by a hinge means to a rear structural member;
   b. two fixed position forward wheels supporting said platform, said wheels having a horizontal common axis which is located a substantial distance rearwardly of said forward edge of said platform, said forward wheels being located at or near the opposite side edges of said platform;
   c. said rear structural member having a substantially vertically disposed section fixedly and non-rotatably connected at the upper end of said rear structural member to a horizontally disposed section extending rearwardly from its connection with said vertically disposed section, said horizontally disposed section being at an elevation above that of said platform, the lower end of said vertically disposed section being attached by a hinge means to the said rearward edge of said platform such that there is an angle between said platform and said vertically disposed section, said hinge means having an axis about which rotation may take place which is parallel to the said common axis of said forward wheels, said hinge means being such as to allow said platform to move with respect to said vertically disposed section such that the said angle between them may increase from an angle of substantially 90°;
   d. means to prevent said platform and said vertically disposed section of said rear structural member from moving with respect to each other at their hinged connection such that the said angle between them becomes substantially less than 90°;
   e. a single swiveling rear wheel of the off-set type supporting and attached to the underside of said horizontally disposed section of said rear structural member, which swiveling rear wheel swivels about an axis of swivel which is perpendicular to said horizontally disposed section and which axis of swivel lies in a vertical plane bisecting the distance between said forward wheels and to which vertical plane the said common axis of said forward wheels is perpendicular, said axis of swivel not passing through the horizontal axis about which said rear wheel rotates;
   f. a rigid handle which is fixedly attached to and extends upwardly from the upper surface of said horizontally disposed section of said rear structural member at a point on said rear structural member which is at least as far rearwardly as said axis of swivel;
   g. a selectively disengageable latching means to lock the position of said platform with respect to said vertically disposed section of said rear structural member such that the angle between them may be selectively maintained at 90°; and
   h. a stop means which during breakdown of said cart to the position for picking up articles will prevent said rigid handle from being lowered rearwardly and downwardly more than is necessary to cause the said forward edge of said platform to be lowered to the level of said surface;

wherein in said cart the sizes and locations of the foregoing elements relative to each other are such that said forward edge of said platform will selectively drop to the level of said surface upon disengaging said latching means and then pulling downwardly and backwardly on said handle, by reason that such pulling causes the rotation about said hinge means of said vertically disposed section such that the angle between said vertically disposed section and said platform increases and causes an increase in elevation of said hinge means and the said rearward edge of said platform.

8. The cart of claim 7 wherein said rigid handle is a T-bar handle having a lower end, which lower end is attached to and extends upwardly from the upper surface of said horizontally disposed section, which lower end has an axis which is substantially that of said axis of swivel.

* * * * *